Jan. 12, 1965 D. A. AVNER 3,165,176
SHOCK ABSORBER
Filed May 28, 1963
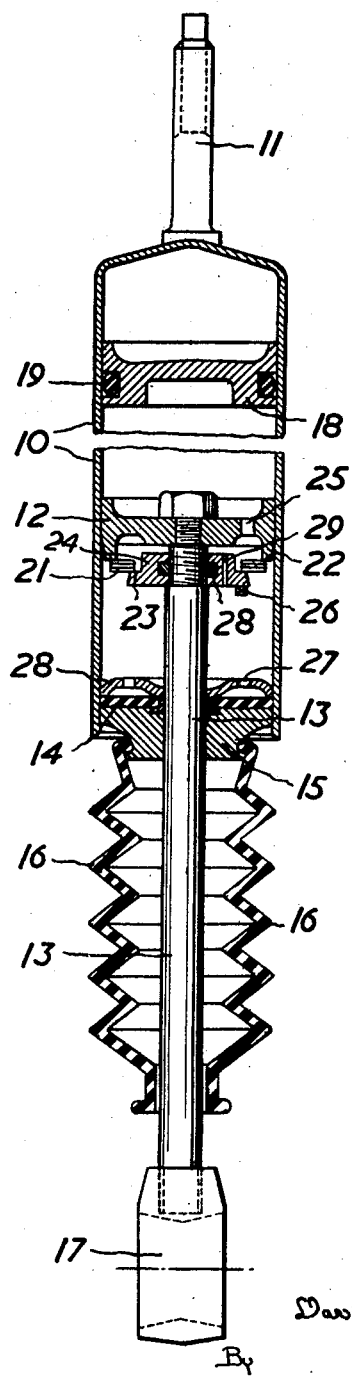
Inventor
David Alan Avner
By
Scrivener and Parker
Attorneys

3,165,176
SHOCK ABSORBER
David Alan Avner, Coventry, England, assignor to Girling Limited, Birmingham, England, a British Company
Filed May 28, 1963, Ser. No. 283,785
Claims priority, application Great Britain June 30, 1962
1 Claim. (Cl. 188—96)

This invention relates to improvements in telescopic dampers of the single tube type in which a piston reciprocates in a cylinder filled with fluid and the piston incorporates a valve of the annular flexible plate or strip type controlling the flow of fluid through the piston in both directions.

According to our invention, in a damper of that kind the loading of the valve in the piston is adjustable by means of a nut in screw-threaded engagement with the piston-rod, and the nut carries means whereby, when the damper is extended, the nut is keyed to an end closure of the cylinder or a part non-rotatably associated with the end closure so that the axial position of the nut member and hence the loading of the valve can be adjusted by rotation of the piston-rod relative to the damper body.

The spring-loading of the valve in the piston can thus be rapidly and easily adjusted after disconnecting the piston-rod or the cylinder from the part of a vehicle or the like to which it is attached, and it is not necessary to dismantle the damper.

One form of damper embodying our invention is illustrated by way of example in the accompanying drawing which is a longitudinal section of the damper.

The body of the damper illustrated is formed by a cylinder 10 closed at its upper end which carries an extension 11 by which the cylinder is connected to a part of a vehicle. Working in the cylinder is a piston 12 secured to the upper end of a piston-rod 13 working through a seal 14 and a guide 15 forming a closure for the lower end of the cylinder. The projecting portion of the piston-rod is protected by a boot 16 of bellows form attached at its ends to the closure 15 and the rod respectively, and the extremity of the rod carries an attachment eye 17.

A floating piston 18 provided with an O-ring or other seal 19 is located in the cylinder between the piston 12 and the upper end of the cylinder.

The flow of fluid through the piston 12 in both directions is controlled by a valve formed by an annular shim or by a number of superimposed annular flexible plates or shims 21 located between an annular seating 22 on the underside of the piston and an oppositely directed annular seating 23 of smaller diameter on a nut 24 in screw-threaded engagement with the piston-rod immediately below the piston. A passage 25 extends through the piston above the valve or there may be a series of such passages.

The shims 21 can flex in either direction to allow liquid to pass through the piston in both directions at controlled pressures determined by the axial position of the seating on the nut relative to the seating on the piston.

The nut is provided on its lower face, that is the face remote from the nut, with an axially projecting dog 26 which, when the damper is fully extended, is adapted to engage in any one of a ring of holes 27 in a dished washer 28 located against the end closure 15 and held against angular movement relative to the cylinder.

If it is desired to adjust the setting of the valve either the cylinder or piston-rod is disconnected from the vehicle and the damper is extended axially until the dog 26 engages in one of the holes 27. Relative angular movement between the cylinder and piston-rod will then rotate the nut on the piston-rod and adjust the axial position of the seating on the nut relative to that on the piston.

The nut may incorporate any convenient means for holding it against rotation under vibration in the normal operation of the damper such, for example, as a nylon ring 28 or other insert located in an annular recess in the bore of the nut and engaging the screw-thread on the piston-rod.

The nut may have a small bleed orifice 29 through it for the passage of fluid through it independently of the valve, and the rate of flow through this orifice may also be controlled by the adjustment of the nut which varies the spacing between the nut and the adjacent end of the piston.

I claim:

A telescopic damper comprising a cylinder adapted to be filled with fluid, a piston working in the cylinder, a piston-rod attached to the piston and working through an end closure for the cylinder, a nut in screw-threaded engagement with the piston-rod adjacent to the piston, an annular valve seating on the piston directed towards the nut, an oppositely directed concentric valve seating on the nut, a valve member comprising at least one flexible annular plate located between and engaging with said seatings, means on the nut for keying engagement with a part non-rotatably associated with the cylinder when the damper is extended, whereby relative rotation between the cylinder and the piston-rod rotates the nut on the piston-rod to adjust it axially and vary the loading of the valve member, and a bleed orifice through said nut and having an end extending towards said piston whereby movement of said nut towards and away from said piston moves said orifice end with respect to said piston to effect control of the rate of flow through said orifice.

References Cited in the file of this patent

UNITED STATES PATENTS

| | | |
|---|---|---|
| 2,130,939 | Williams | Sept. 20, 1938 |
| 2,296,732 | Oyston et al. | Sept. 22, 1942 |
| 2,320,697 | Binder | June 1, 1943 |
| 2,507,266 | Patriquin | May 9, 1950 |
| 2,670,814 | Ball | Mar. 2, 1954 |

FOREIGN PATENTS

| | | |
|---|---|---|
| 1,065,526 | France | Jan. 13, 1954 |
| 969,330 | Germany | May 22, 1958 |